United States Patent
Simmons et al.

(10) Patent No.: US 9,142,942 B2
(45) Date of Patent: Sep. 22, 2015

(54) METHOD FOR IN SITU MULTIPLE CABLE TERMINATIONS

(71) Applicant: Reel Power Licensing Corp., Oklahoma City, OK (US)

(72) Inventors: Robert Terry Simmons, Oklahoma City, OK (US); William Richard Schmerheim, Grosse Pointe Farms, MI (US); Max Charles William Clarke, Oklahoma City, OK (US); Carl Denver Parker, Yukon, OK (US); Benton Frederick Baugh, Houston, TX (US)

(73) Assignee: Reel Power Licensing Corp., Oklahoma City, OK (US)

( * ) Notice: Subject to any disclaimer, the term of this patent is extended or adjusted under 35 U.S.C. 154(b) by 225 days.

(21) Appl. No.: 13/708,555

(22) Filed: Dec. 7, 2012

(65) Prior Publication Data
US 2014/0157577 A1 Jun. 12, 2014

(51) Int. Cl.
*H01R 43/04* (2006.01)
*H02G 1/08* (2006.01)
*H01R 43/05* (2006.01)
*H01R 43/28* (2006.01)

(52) U.S. Cl.
CPC ............... *H02G 1/081* (2013.01); *H01R 43/05* (2013.01); *H01R 43/28* (2013.01); *Y10T 29/49826* (2015.01); *Y10T 29/49861* (2015.01); *Y10T 29/49925* (2015.01)

(58) Field of Classification Search
USPC ........... 29/428, 434, 445, 469, 515, 828, 835, 29/837, 867, 868; 166/338, 343, 347; 254/134.3 FT, 134.3 R, 134.4; 405/169, 405/191, 195.1
See application file for complete search history.

(56) References Cited

U.S. PATENT DOCUMENTS

| | | | | |
|---|---|---|---|---|
| 4,243,864 | A | * | 1/1981 | Vieau et al. ................. 219/69.12 |
| 4,261,230 | A | * | 4/1981 | Sindelar .......................... 81/9.51 |
| 4,490,084 | A | * | 12/1984 | Collier et al. ............. 414/225.01 |
| 8,800,967 | B2 | * | 8/2014 | Carlson et al. ........ 254/134.3 FT |
| 8,973,235 | B2 | | 3/2015 | Henderson et al. |
| 2007/0251516 | A1 | * | 11/2007 | Nieber et al. .................... 125/21 |
| 2010/0236045 | A1 | | 9/2010 | Galindo et al. |
| 2013/0221298 | A1 | * | 8/2013 | Bennett et al. ........ 254/134.3 FT |

\* cited by examiner

*Primary Examiner* — Paul D Kim
(74) *Attorney, Agent, or Firm* — Martin G. Ozinga; Phillips Murrah PC

(57) ABSTRACT

The method of attaching a pulling head to two or more wires or cables for installation in a conduit, comprising providing a first area for attaching the pulling head, placing two or more wire or cable supply spools on a first side of the first area, placing a receiving spool on the opposite or second side of the first area, feeding a portion of the wires or cables from the wire or cable supply spools onto the receiving spool, placing a terminating table in the first area below the wires or cables, cutting the wires or cables at staggered length from the receiving spool, stripping a portion of the covering from the wires or cables from the outer diameter of the two or more wires or cables, installing a connection onto each of the two or more wires or cables.

5 Claims, 10 Drawing Sheets ical field

This invention relates to the method of installing axially spaced crimp connectors onto multiple independent cables for connection to a single pulling head for pulling into a conduit.

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

The field of this invention is that of putting multiple independent cables onto a single spool and terminating the cables with a pulling head with axially spaced connectors for pulling into a conduit.

Multiple conductor cabling consisting of multiple, independent wires or conductors are an integral part of many systems, including electrical and power systems. Such cabling may be installed by pulling the independent conductors in parallel through pipe or conduit over long distances. A pulling rope running through the conduit is attached to each conductor, and the rope is pulled through the conduit, drawing the multiple conductors cabling from multiple spools or other delivery mechanisms and through the conduit. The amount to force required to pull several conductors through a length conduit, potentially with many bends or turns, may be substantial, and if the force is applied to the cabling improperly, one or more conductors may be prohibitively damaged during the pull. Such damage may hamper performance of the multiple conductor cabling or present safety issues. In addition, finding and repairing the damaged portions of the conductors may be prohibitively expensive or physically impossible, and may necessitate replacement of the entire cabling.

The conductors may be attached to the pulling rope through a pulling head. Traditionally, pulling heads are created for a given pull on an ad hoc basis at the jobsite. This procedure adds time and expense to the installation of the cabling and requires the installers have the tools and skills necessary for creation of the pulling heads. These ad hoc created pulling heads may also lead to damaged conductors during the pull.

Recent industry progress has been made in terms of wrapping multiple wires or cables onto a single spool, bringing the single spool to a termination table in a shop, and terminating the cable with a pulling head before shipment to the field for installation. Each wire or cable has an independent crimp connector from the pulling head, and each crimp connector represents a lump in the cable. If all the crimp connector "lumps" occur at one place, they simply will not go into a conduit which is efficiently designed, i.e. not oversized. For this reason, they are spaced apart a distance, i.e. 6 inches. When the single spool is brought to the termination table, all the wires or cables will be cut to a common dimension. As they are cut to a required varying distance. An amount of expensive cable will be wasted.

A need has existed since the inception of this handling of multiple conductors or wires or cables in a conduit which will quickly install a termination head without wasting sections of conductor or wire or cable in each termination.

BRIEF SUMMARY OF THE INVENTION

The object of this invention is to provide a table which can be positioned between multiple supply spools and a single paralleling spool and facilitate the installation of a pulling head A second object of this invention is to provide a pulling head system which requires only a single cut to be made on each wire or cable to eliminated the waste of wire or cable.

A third object of this invention is to provide a table which is mobile and which can be moved from one termination location to another termination location.

Another object of the present invention is to provide a system which will automatically handle different wire or cable sizes.

DETAILED DESCRIPTION OF THE INVENTION

Figure 1:
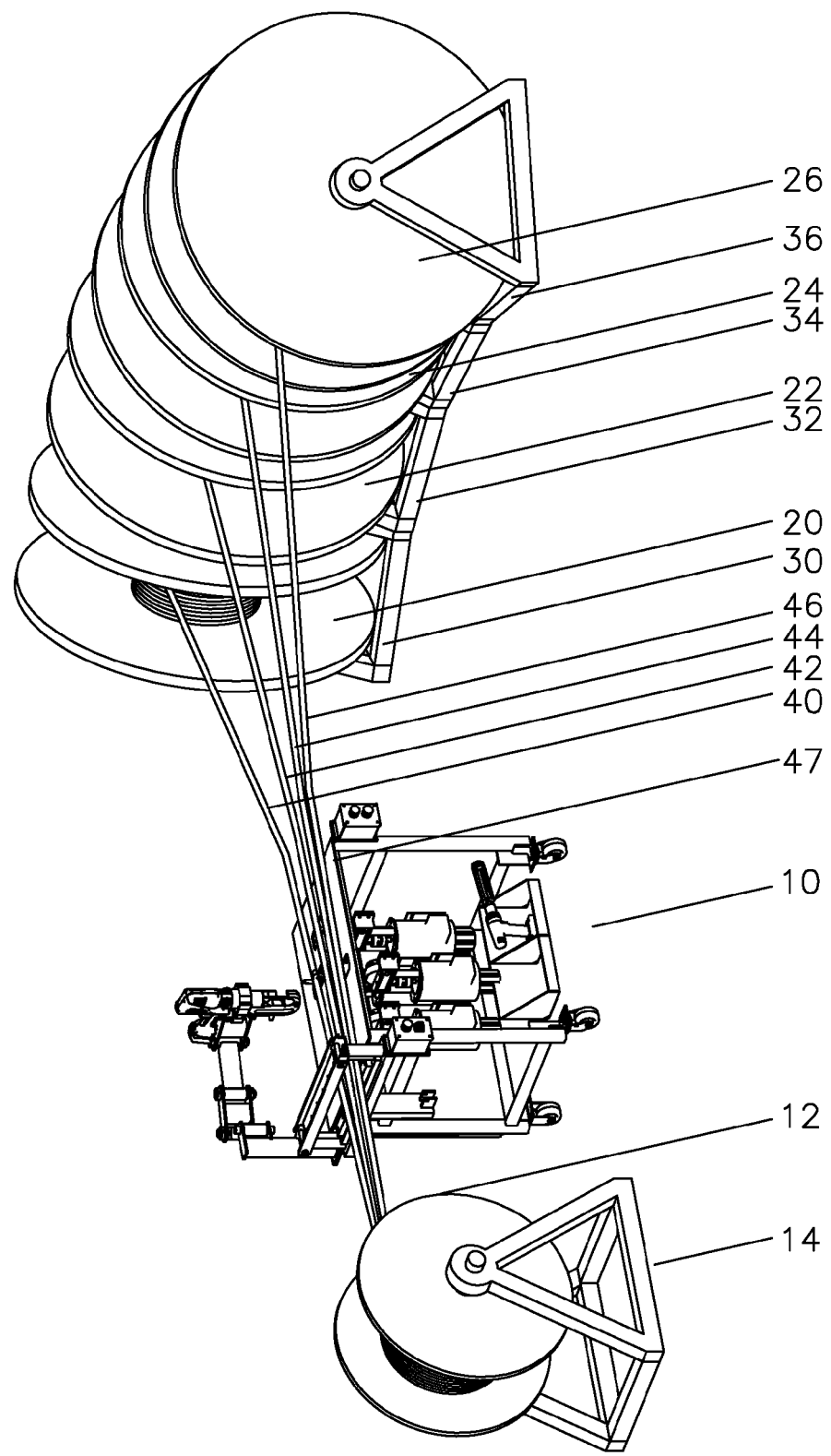
FIG. 1 is a view of a mobile termination table of this invention shown between 4 supply spools and a single receiving spool.

Referring now to FIG. 1, a mobile termination table 10 is shown positioned between a receiving spool 12 on a receiving spool stand 14 and supply spools 20, 22, 24, and 26 mounted on supply spool stands 30, 32, 34, and 36. Wires or cables 40, 42, 44, and 46 are shown between supply spools and the receiving spool and generally laying across the table top 47 of mobile termination table 10.

Figure 2:
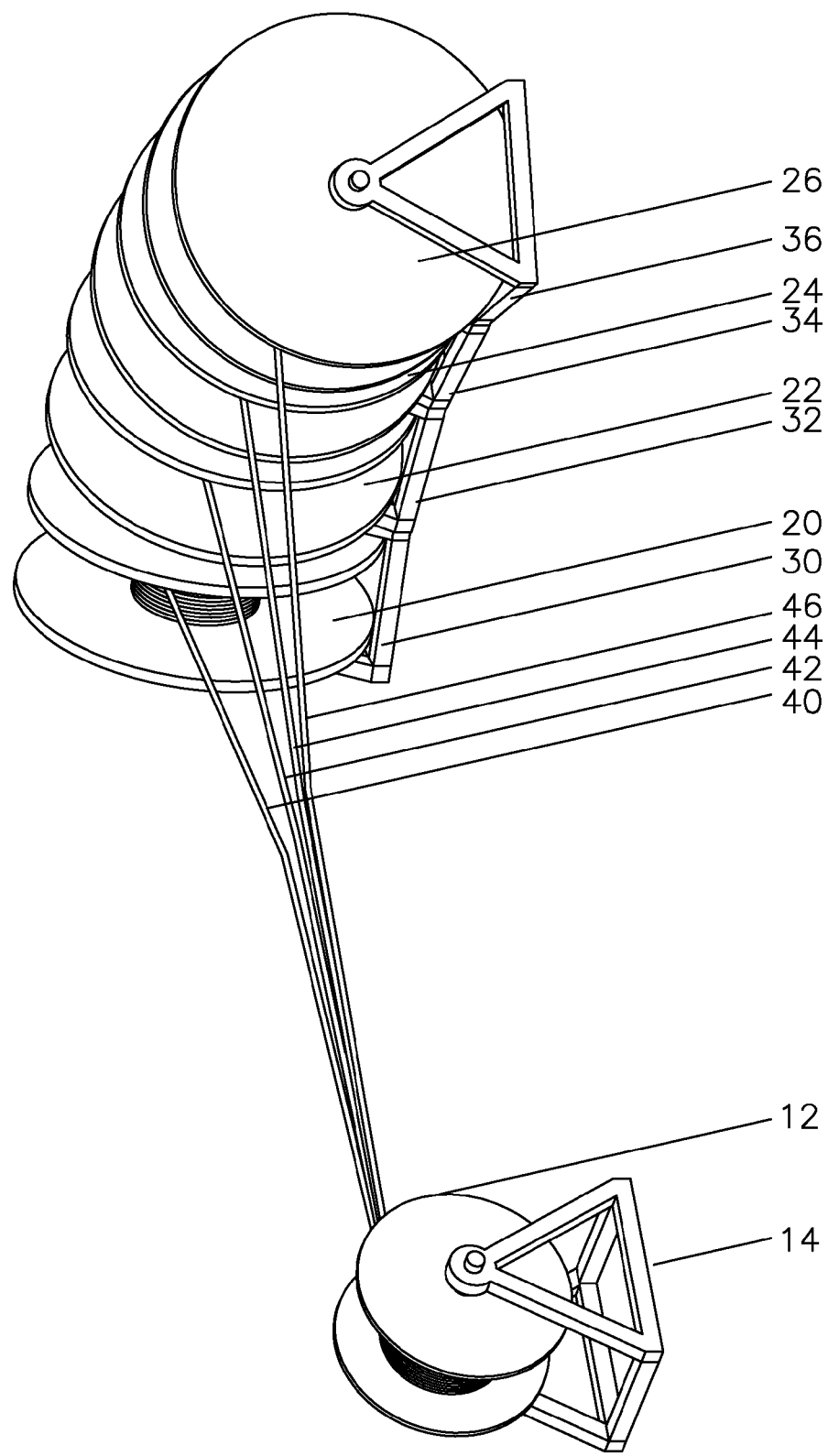
FIG. 2 is a view similar to FIG. 1 as shown with the cable between the 4 supply spools and the receiving spool, before the mobile termination table is moved into place.

Referring now to FIG. 2, the arrangement as seen in FIG. 1 is shown with the wires or cables from the four supply spools 20, 22, 24, and 26 being wrapped in parallel onto the receiving spool 12. Historically, these wires or cables would be cut off waiting on the termination head.

Figure 3:
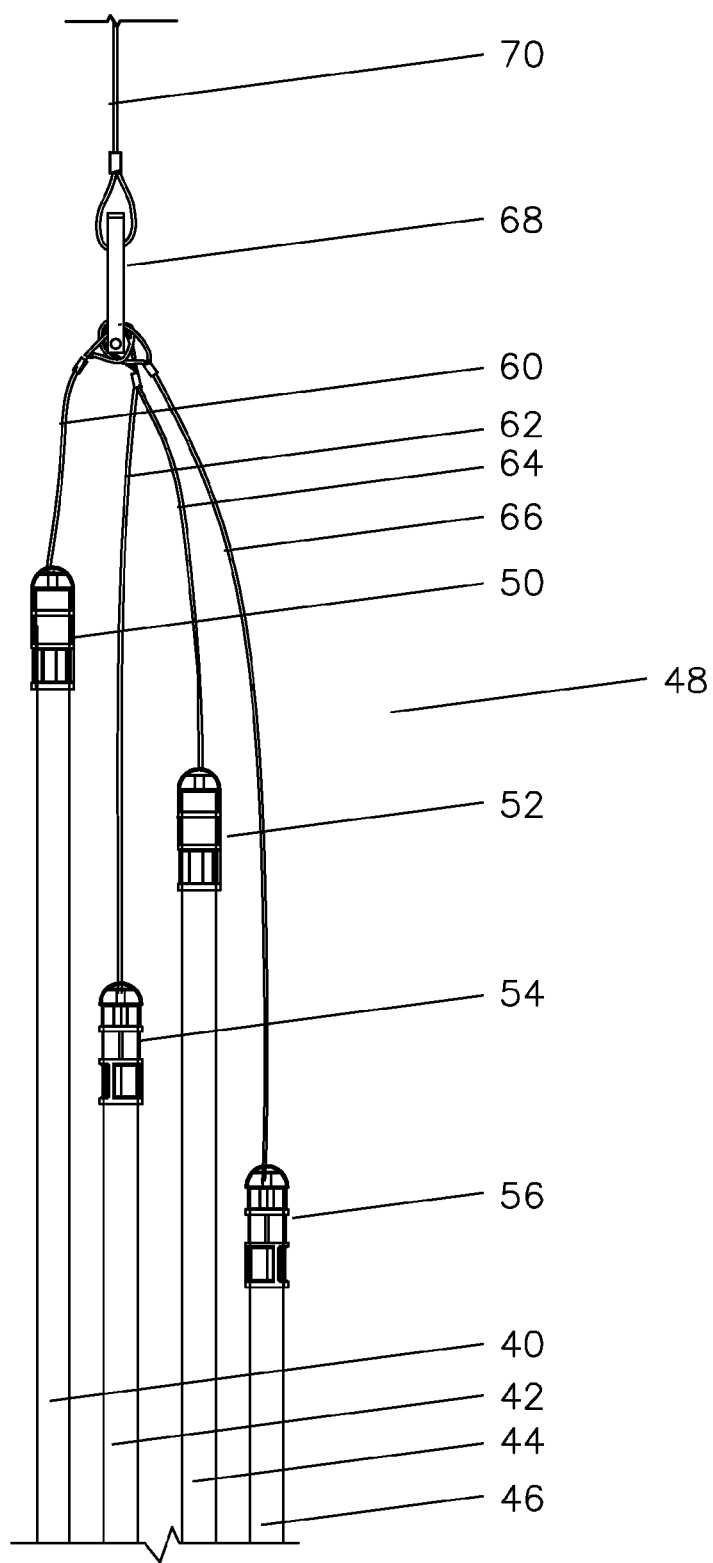
FIG. 3 is a view of a pulling head such as would be installed on the wires or cables after the wires or cables are cut and stripped by the mobile termination table.

Referring now to FIG. 3, a pulling head 48 is shown having 4 wires or cables 40, 42, 44, and 46 having connectors 50, 52, 54, and 56 crimped in place and with small cables 60, 62, 64, and 66 going to a common connector 68 and pulling rope 70 attached to that connector. It should be noted that the connectors are spaced apart a common distance, i.e. 6", so that when the connectors are pulled into a conduit, they represent 4 small lumps rather than one large lump.

Figure 4:
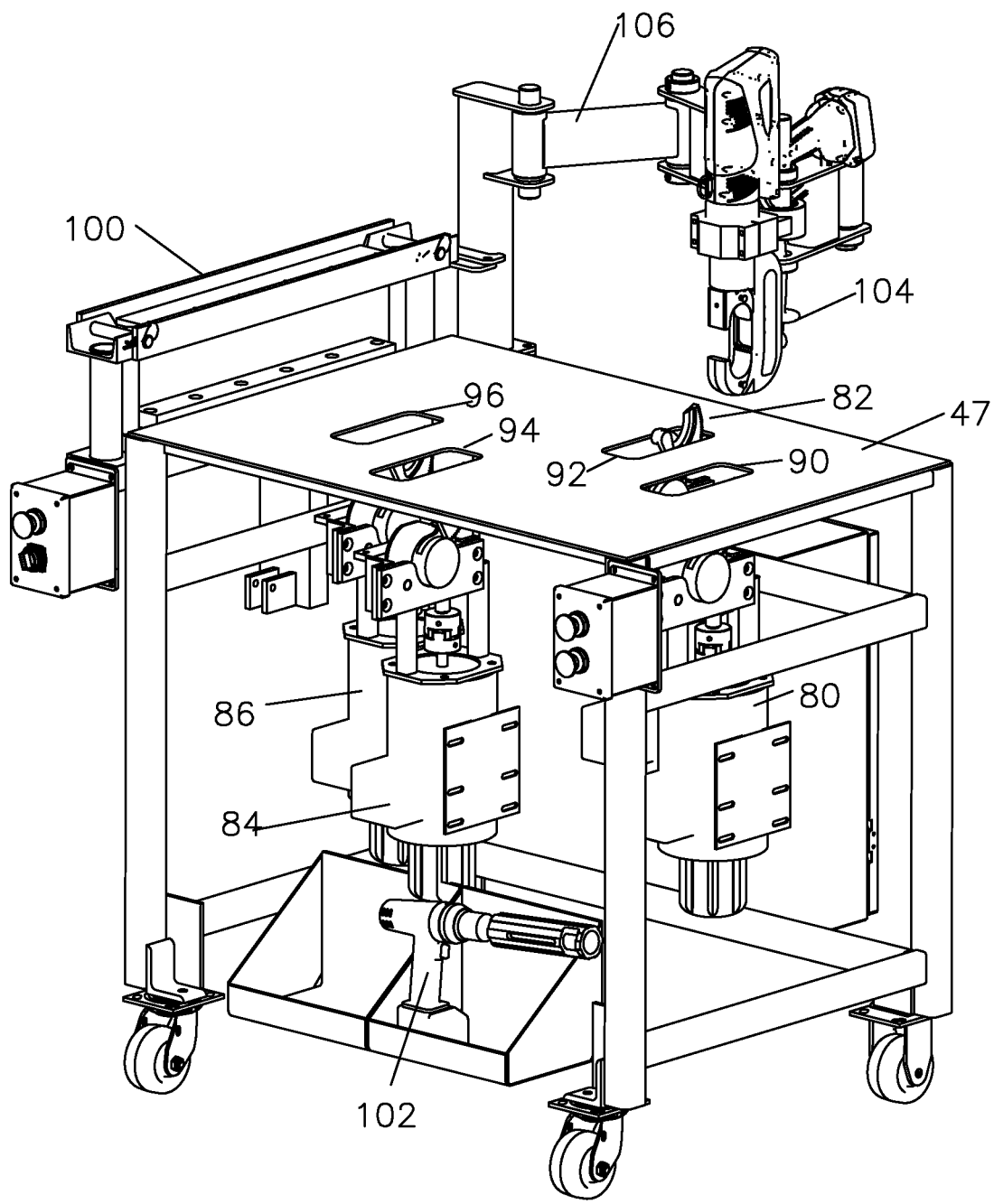
FIG. 4 is a view of the mobile termination table as shown in FIG. 1.

Referring now to FIG. 4, mobile termination table 10 has four cutters 80, 82, 84, and 86 mounted below table top 47 and under windows 90, 92, 94, and 96. Cutter 82 is shown raised through window 92 and ready to cut a wire or cable. As can be seen, when a single cut is made on each wire or cable with these spaced apart cutters, the length of the wire or cable from the receiving spool will be appropriate for the installation of the pulling head 48 without re-cutting and wasting some of the wire or cable. Clamp 100 can be lowered to retain the wires or cables in places after being cut. Stripper 102 can be used to remove the insulation or covering off the wires or cables to facilitate the installation of a connection. Crimping tool 104 is mounted on pivoting arm 106 for the assistance if the worker and the speed of the operations.

Figure 5:
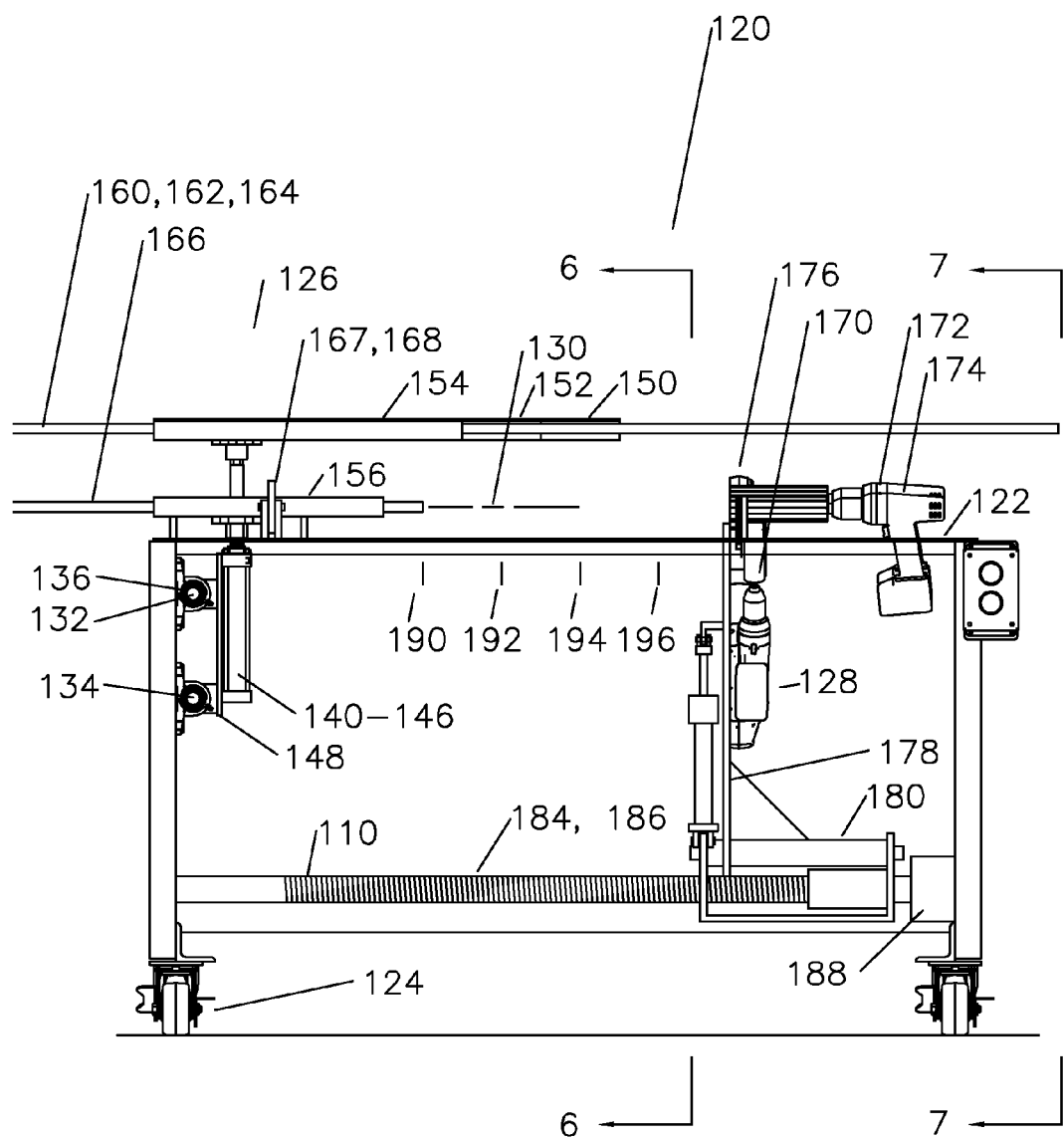
FIG. 5 is a view of a more automated mobile termination table showing the wires or cables going from the right side to the left side of the view.

Referring now to FIG. 5, an alternate embodiment of this invention is illustrated. Mobile termination table 120 is shown with table top 122, wheels 124, cable lifter 126, termination tool 128 and attachment centerline 130. Cable lifter 126 will move each wire or cable into the attachment centerline 130 in sequence and termination tool 128 will cut, strip, and crimp the connector in place. Cable lifter 126 comprises drive screw 132 and dummy shaft 134 mounted on bearings 136, cylinders 140, 142, 144, and 146 mounted on plate 148 and supporting wire or cable clamps 150, 152, 154, and 156. Wire or cable clamps 150, 152, 154, and 156 are supporting wires or cables 160, 162, 164 and 166, with wire or cable clamp 156 being closed by wheels 167 and 168 to positively locate wire or cable 166 for cutting, stripping and crimping.

Termination tool 128 supports cutter 170, strippers 172 and 174, and crimper 176 on plate 178 which is in turn mounted on a pivoting tube 180 and in turn on slide 182. Slide 182 is mounted on drive screw 184 and dummy shaft 186 and is powered by motor 188 for movement from left to right in this figure. As termination tool 128 moves from left to right, it will pass four cutting planes 190, 192, 194, and 196, which are appropriate for cutting wires or cables 160, 162, 164, and 166. Wires or cables 160, 162, and 164 are shown as not being cut and wire or cable 166 is cut at cutting plane 190.

Figure 6:
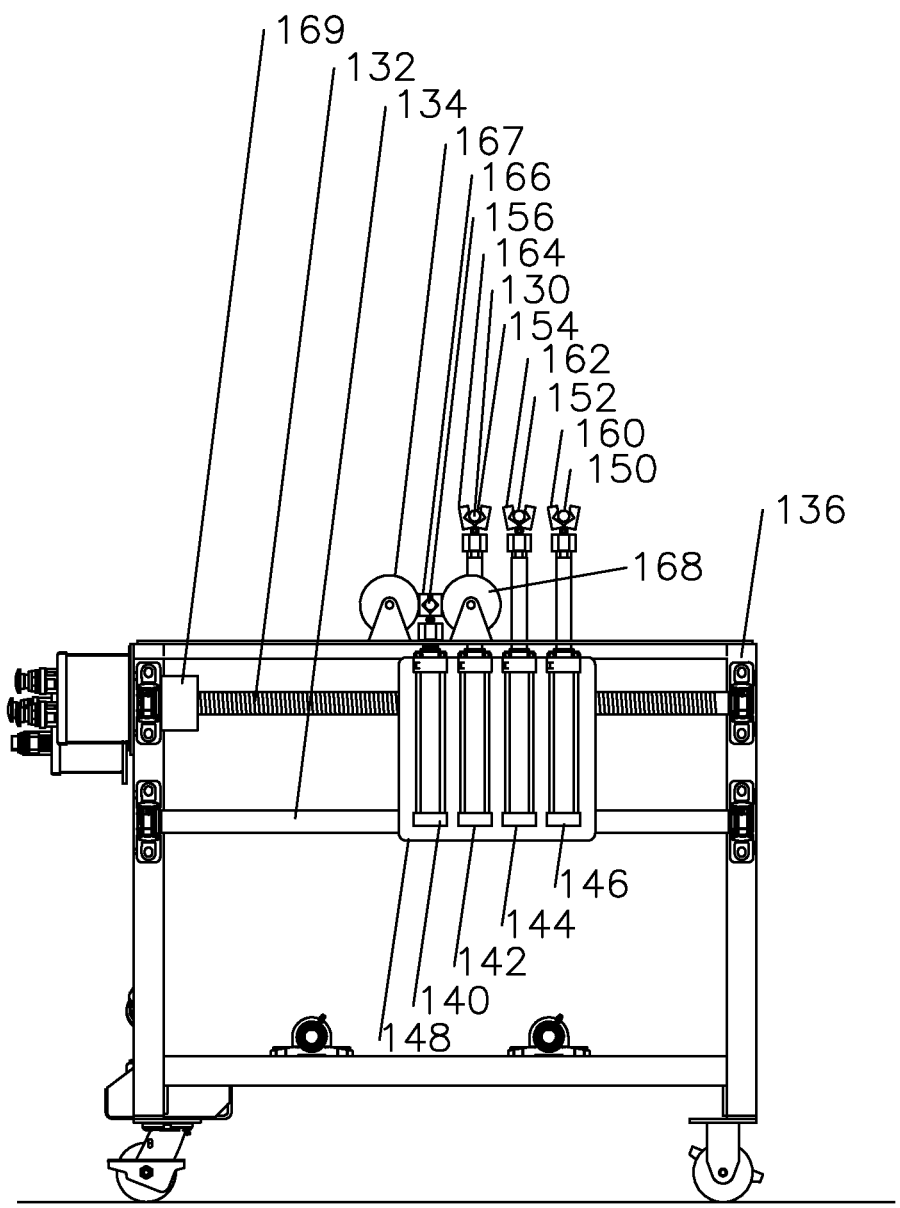
FIG. 6 is a cross section taken along lines "6-6" on FIG. 5 and showing the cable lifter mechanisms.

Referring now to FIG. 6. cylinders 142, 144, and 146 have raised wires or cables 160, 162, and 164 out of the working area while cylinder 140 has lowered cable 166 and clamp 156 to the level of the attachment centerline 130 between rollers 167 and 168. Motor 169 will rotate the drive screw 132 to position the plate 148 and required for wire or cable to be appropriately aligned with the attachment centerline 130.

Figure 7:
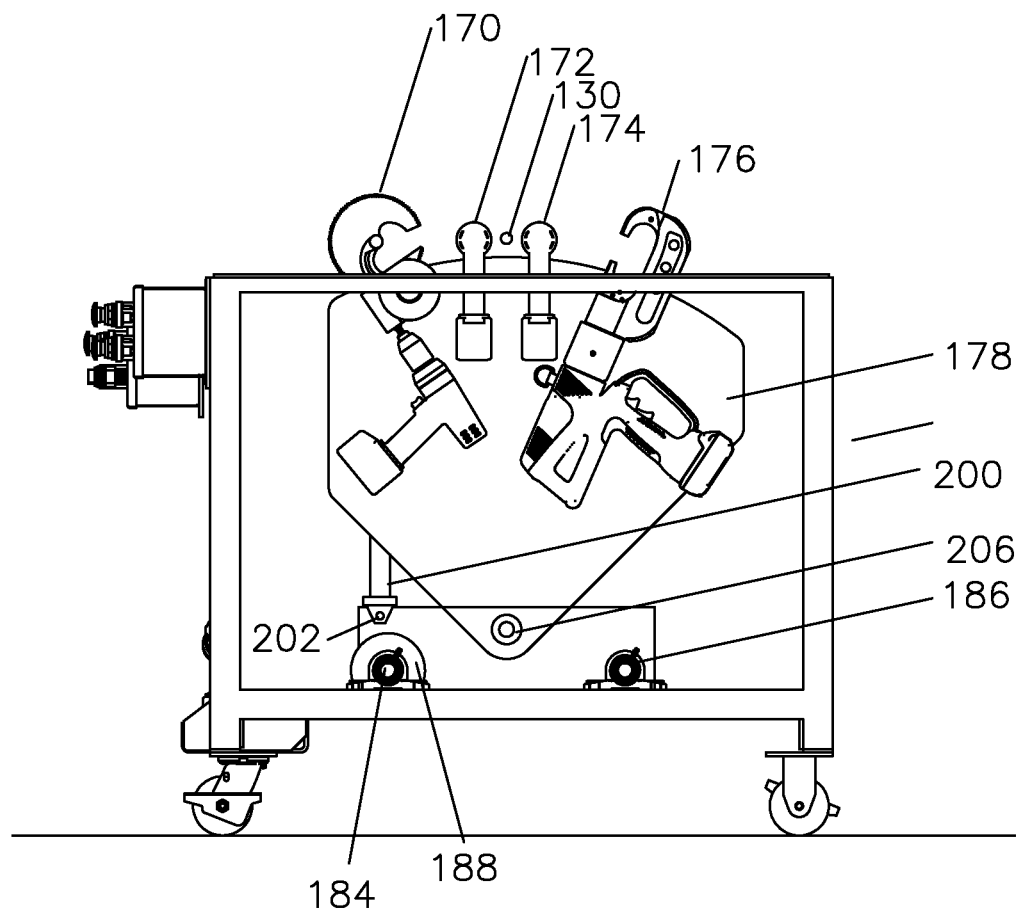
FIG. 7 is a view taken along lines "7-7" of FIG. 5 and termination tool grouping.

Referring now to FIG. 7 termination tool is shown in an intermediate position with positioning screw 200 mounted about pivot pin 202. When the position screw 200 is extended or retracted, the plate 178 will be rotated about the pin 206 to appropriately position the cutter, strippers, or crimper in a position about the attachment centerline 130 to cut, strip, or crimp the appropriate wire or cable.

Figure 8:
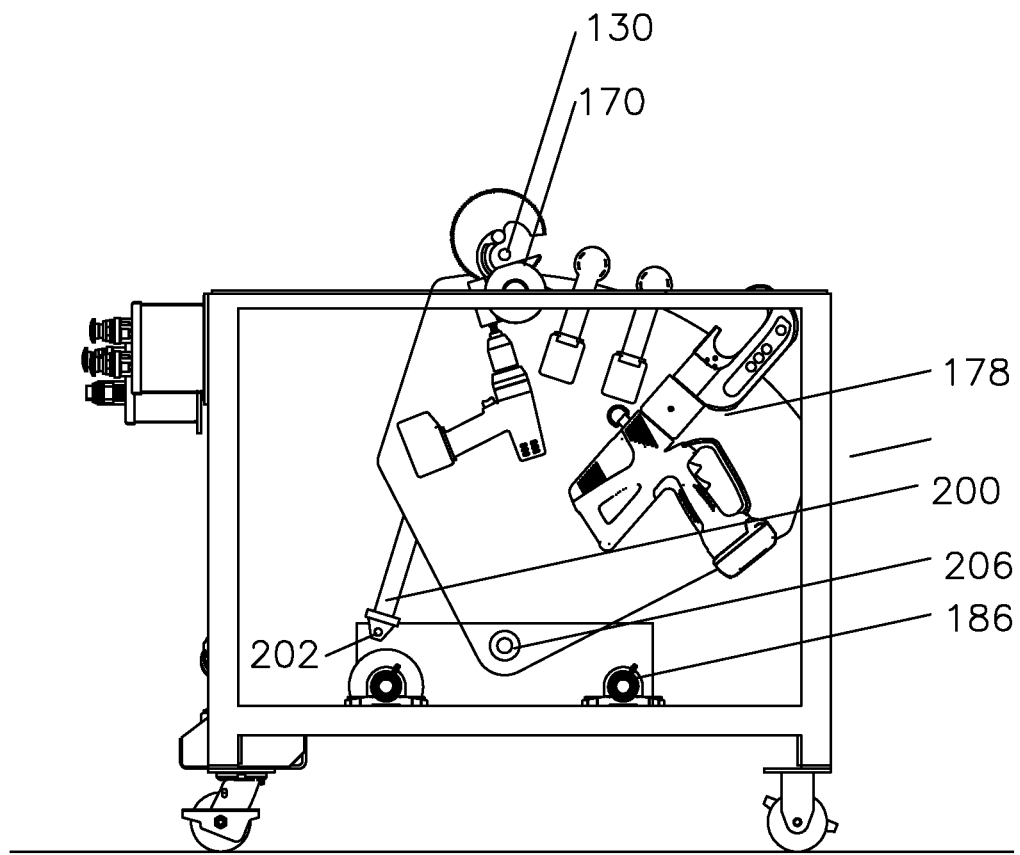
FIG. 8 is a view similar to FIG. 7 with the cutter aligned to cut a wire or cable.

Referring now to FIG. 8, positioning screw 200 has rotated plate 178 to position the cutter in a position to cut whatever wire or cable is in the attachment centerline 130.

Figure 9:
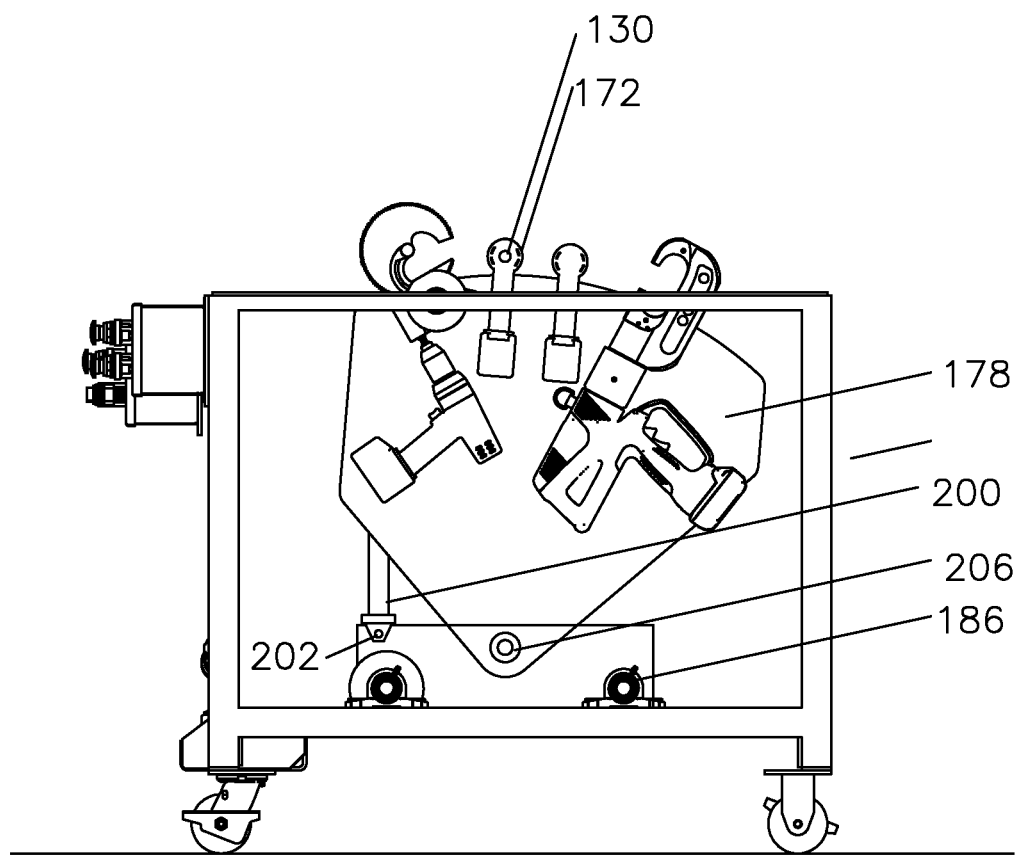
FIG. 9 is a view similar to FIG. 7 with the stripper aligned to strip a wire or cable.

Referring now to FIG. 9, positioning screw 200 has rotated plate 178 to position one of the strippers 172 in a position to strip whatever wire or cable is in the attachment centerline 130.

Figure 10:
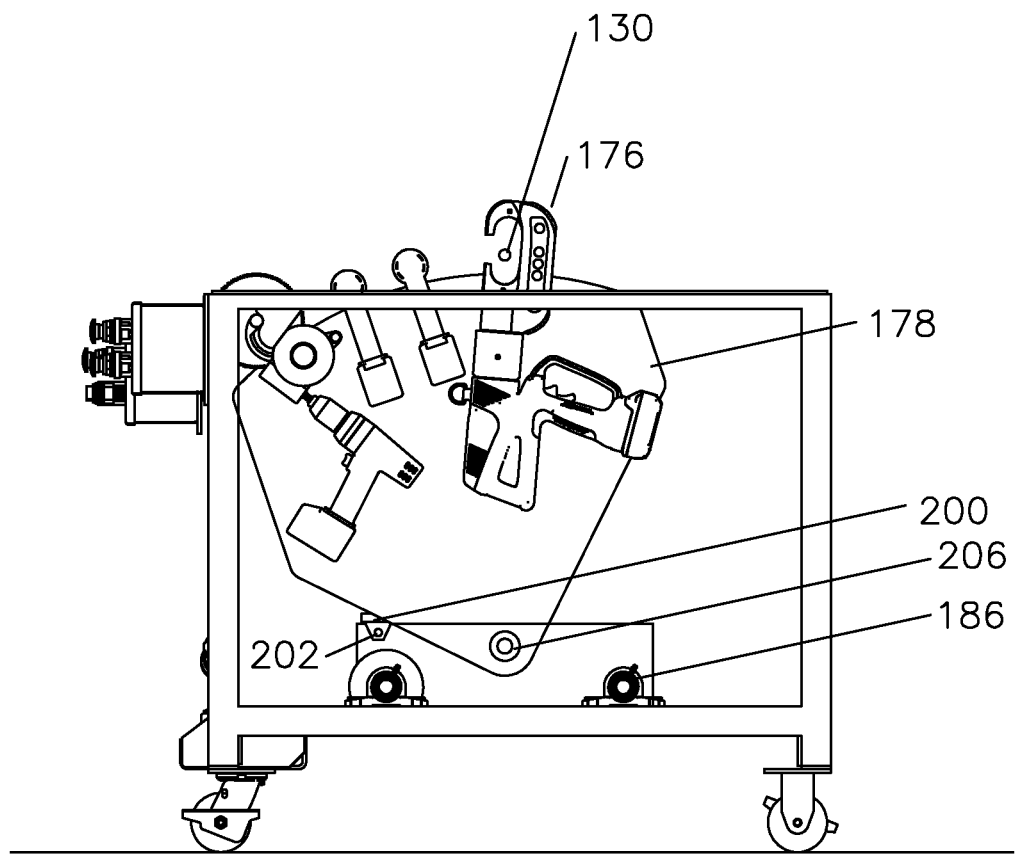
FIG. 10 is a view similar to FIG. 7 with the crimper aligned to crimp a wire or cable.

Referring now to FIG. 10, positioning screw 200 has rotated plate 178 to position the crimper 176 in a position to crimp whatever wire or cable is in the attachment centerline 130. In this manner, the mobile termination table 120 can automatically position wires or cables, cutters, and strippers to prepare the end of the wires or cables and allow the person to inspect the preparation and slip a crimp type connector onto each wire or cable. At that time the table can position the wires or cables and crimpers to automatically crimp the connectors onto the wires or cables.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

That which is claimed is:

1. The method of attaching a pulling head to two or more wires or cables for installation in a conduit, comprising:
   providing a first area for attaching said pulling head;
   placing two or more wire or cable supply spools on a first side of said first area;
   placing a receiving spool on the opposite or second side of said first area;
   feeding a portion of the two or more wires or cables from said wire or cable supply spools onto said receiving spool;
   placing a terminating table in said first area below said wires or cables;
   designating an attachment centerline at a first elevation and an attachment point for each of said two or more wires or cables, spaced apart axially along said attachment centerline at a predetermined spacing;
   placing each of said two or more wire or cables in two or more clamps at a second elevation higher than said first elevation;
   mounting a cutter and a stripper such that each of said two or more wires or cables can be moved to said attachment centerline and axially along said attachment centerline to positions appropriate to cutting, and
   stripping each of said two or more wires or cables; and
   providing a lifter to moves said two or more wires or cables between said first elevation and said second elevation.

2. The method of claim 1, further comprising lowering each of said two or more wires or cables from said second elevation to said first elevation to said attachment centerline, cutting said wires or cables and stripping a portion of the covering from of said wires or cables.

3. The method of claim 2, further comprising inserting a crimp type connector onto each of said two or more wires or cables.

4. The method of claim 3, further comprising moving each of said two or more said wires or cables back to said attachment centerline and crimping said crimp type connectors.

5. The method of claim 1, further comprising mounting a cutter, a stripper, and a crimper on a plate.

* * * * *